United States Patent
Mortimer et al.

(10) Patent No.: US 8,040,223 B2
(45) Date of Patent: Oct. 18, 2011

(54) DEVICE AND METHOD FOR ENHANCING SENSORY PERCEPTION OF VIBRATIONAL STIMULI

(75) Inventors: Bruce J. P. Mortimer, Maitland, FL (US); Gary A. Zets, Maitland, FL (US)

(73) Assignee: Engineering Acoustics, Inc., Casselberry, FL (US)

( * ) Notice: Subject to any disclaimer, the term of this patent is extended or adjusted under 35 U.S.C. 154(b) by 329 days.

(21) Appl. No.: 12/274,065

(22) Filed: Nov. 19, 2008

(65) Prior Publication Data

US 2009/0128305 A1    May 21, 2009

Related U.S. Application Data (60) Provisional application No. 61/003,996, filed on Nov. 21, 2007.

(51) Int. Cl.
*H04B 3/36* (2006.01)

(52) U.S. Cl. .............. 340/407.1; 340/407.2; 310/71; 310/72; 601/46; 601/78; 601/79; 601/82; 601/87; 715/701; 715/702

(58) Field of Classification Search ........... 340/407.1, 340/407.2; 310/71; 601/46, 78, 79, 82, 87; 715/701, 702
See application file for complete search history.

(56) References Cited

U.S. PATENT DOCUMENTS

| 7,798,982 B2 * | 9/2010 | Zets et al. ............. 601/78 |
| 2006/0138885 A1 * | 6/2006 | Uchiumi et al. ......... 310/81 |

* cited by examiner

*Primary Examiner* — Tai T Nguyen
(74) *Attorney, Agent, or Firm* — Larry D. Johnson (57) ABSTRACT

A method and device for improving the detection of a vibrotactile stimulus. Such method may include the steps of temporarily altering the threshold of vibrational detection prior to the onset of a vibrotactile stimulus. This allows the vibrotactile system to achieve improved detection of the intended vibrotactile alert or communication stimulus without necessarily increasing the vibratory displacement amplitude of the stimulus. A corresponding enhanced vibrotactile transducer device is able to produce, over a wide frequency range, or at multiple frequencies, a vibrational stimulus against the body of a user.

14 Claims, 5 Drawing Sheets

FIGURE 1

Prior Art

FIGURE 2

Prior Art

DEVICE AND METHOD FOR ENHANCING SENSORY PERCEPTION OF VIBRATIONAL STIMULI

CROSS REFERENCE TO RELATED APPLICATIONS

This application claims priority to U.S. Provisional Application No. 61/003,996, filed Nov. 21, 2007, the contents of which are incorporated entirely herein by reference.

FIELD OF THE INVENTION

The present invention relates generally to a device and method for enhancing sensory perception of vibrational stimuli.

BACKGROUND OF THE INVENTION

The sense of feel is not typically used as a man-machine communication channel, however, it is as acute and in some instances as important as the senses of sight and sound, and can be intuitively interpreted. Tactile stimuli provide a silent and invisible, yet reliable and easily interpreted communication channel, using the human's sense of touch. Information can be transferred in various ways including force, pressure and frequency dependent mechanical stimulus. Broadly, this field is also known as haptics.

Haptic interfaces can be used to provide additional sensory feedback during interactive tasks. For example computer games make use of portable game consoles that can often include various motors and transducers that apply forces to the housing of the console at various vibrational rates and levels—these forces correlate to actions or activities within the game and improve the users gaming experience. Similar haptic interface techniques can be used for a variety of interface tasks including flat panel touch screens and mobile devices. Many human interface devices, for example a computer interface device, allow some form of haptic feedback to the user. Vibration feedback is more intuitive than audio feedback and has been shown to improve user performance.

A single vibrotactile transducer can be used for a simple application such as an alert. For example discrete temporal information may be provided in a message construct. A plurality of vibrotactile transducers can be used to provide more detailed information, such as direction information. For example, the spatial orientation of the person relative to some external reference can be provided by a body referenced vibrotactile cue. Using an intuitive body-referenced organization of vibrotactile stimuli, information can be communicated to a user. Such vibrotactile displays have been shown to reduce perceived workload by its ease in interpretation and intuitive nature (see for example: Rupert A H 2000, *Tactile Situation Awareness System: Proprioceptive Prostheses for Sensory Deficiencies. Aviation, Space, and Environmental Medicine, Vol.* 71(9):II, p. A92-A99). Tactile displays further can be used as a communication device for implementation under conditions of high physiological stress, such as the conditions associated with communication of army hand signals to personnel in vibrating vehicles or to dismounted soldiers under battle conditions (fatigue, stress and physical activity).

Tactile signals can be represented as variations in pulse, pulse length, amplitude, frequency and rhythm. There are well known limitations in the body's ability to resolve amplitude, frequency, pulse length and spatial acuity (especially for hairy skin).

The body's response to tactile stimuli is somewhat complex depending on stimulus characteristics, body location, transducer geometry and a large number of psychophysical factors. For example, the threshold of vibration detection vs. frequency (Bolanowski, S., Gescheider, G., Verrillo, R., and Checkosky, C. (1988). "Four channels mediate the mechanical aspects of touch", J. Acoust. Soc. Am., 84(5), 1680-1694.

Figure 1:
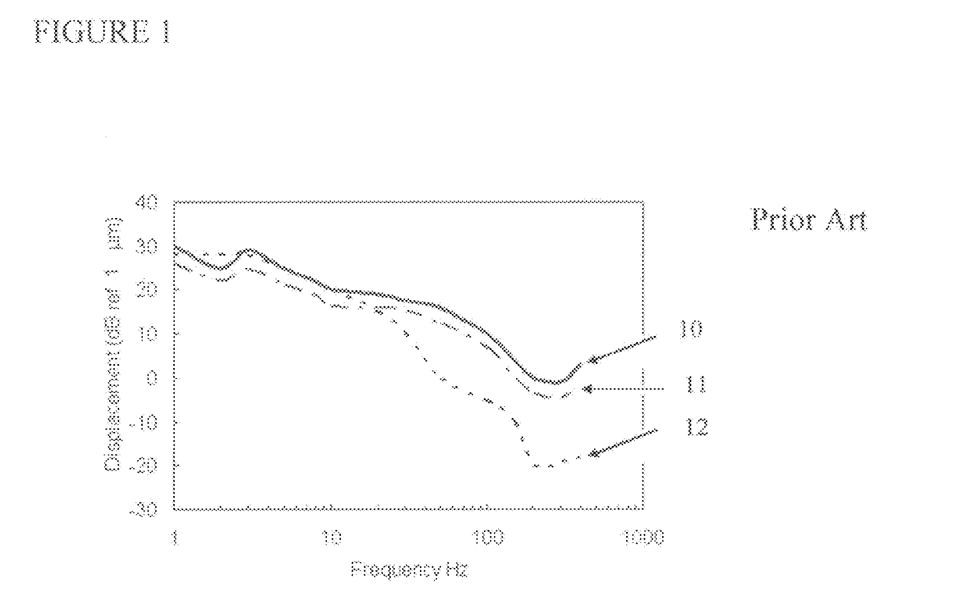
FIG. 1 illustrates a graph of an effect on the sensitivity threshold curve when stochastic resonance is added to the sensory preceptors in an area of hairy skin.

Bolanowski, S., Gescheider, G., and Verrillo, R. (1994). "Hairy skin: psychophysical channels and their physiological substrates", Somatosensory and Motor Research, 11(3), 279-290.) is shown in FIG. 1 for two different skin classifications; smooth 12 (such as the hand) or hairy skin 10 (such as the torso). Sensitivity threshold for hairy skin 10 is about 20 dB higher in the high-frequency range than the glabrous skin 12 curve. There is also a "window" in the sensitivity threshold between about 200 and 400 Hz where the Pacinian (or "Pacinian like") receptors in the body are most sensitive to vibration. This region is usually chosen for intended tactile signals.

Effective vibrotactile alert or communication display systems require both the detection and localization of the vibrotactile stimulus. Reasonable vibrotactor transducer requirements would include a vibration displacement amplitude that is equivalent to or above the human receptor system's sensitivity thresholds. It is known that the human sensitivity to vibration detection depends on body location and frequency. In practical vibrotactile display systems, it is also known that the vibrotactile detection threshold may vary with user physical activity, stress, fatigue and environmental conditions. Reasonable system technical requirements may include limiting the vibrotactile device frequency response to frequencies less than 300 Hz, vibrotactile devices that produce a displacement output that exceeds 24 dB above the threshold for sensitivity for a hairy skin body location (to account for noise), and vibrotactile devices that have a rise time of less than 5 ms (to avoid the accumulation of any delays or lags between the vibrotactile display and any the information provided by other display paths such as the audio or visual senses).

It is known that when a stimulus is sustained at some given level, a decrease with time is generally observed in the output of the activated nerve fibers. The decrease is usually a decrease in the rate of discharge (firing rate) of the neuron and it is accompanied by a decrease in the magnitude of the sensory response. This is known as adaptation. The sensory adaptation rate depends on the vibrotactile stimulus frequency and duration. Generally in tactile communication systems, it is important to keep vibrotactor durations considerably less than what would be required to cause adaptation. Alternatively, in systems where the vibrotactile stimulus is intended to be continuous, the displacement level of the stimulus must usually be kept below the sensory threshold to prevent adaptation.

Vibrotactile transducers can be wearable, mounted within a seat back and/or base, or included within an interface device such as a PDA or gaming interface. In each case, the requirements for the vibrotactile transducer are that the vibrational output be sufficient to illicit a strong, localized vibrotactile sensation (stimulus) to the body. These devices should preferably be small, lightweight, efficient, electrically and mechanically safe and reliable in harsh environments, and drive circuitry should be compatible with standard communication protocols to allow simple interfacing with various avionics and other systems.

Prior art describes a variety of alternative vibrotactile transducers (tactor) design configurations. The design challenge is to maximize vibrational output while minimizing size and weight in order for the device (or multiple devices) to be effectively applied against the body of a user. This trade-off is especially important in wearable vibrotactile applications. Often mechanical resonance is used to increase vibrotactile device efficiency with an associate narrowing or reduction in the usable frequency range.

It is known that sensitivity of skin receptors may be altered by the addition of a sub-sensory vibrational noise stimulus. Such mechanism is believed to be described by the phenomenon of stochastic resonance, whereby the cell sensory threshold for activation is reduced thereby enhancing the function of these detector cells and reducing the threshold of sensitivity. Prior art (U.S. Pat. No. 5,782,873) describes the use of stochastic resonance as a mechanism for stimulating sensory cells and enhancing receptor cell function. This patent teaches a method for introducing a sub-sensory band-limited noise signal to the sensory cell using vibration or electrical stimulation to the skin. Prior art further teaches that the stimulus should be approximately 90% of the sensory displacement sensitivity. Sub-sensory stimuli are presumed necessary as the body is known to adapt to continuous stimuli which would then render the stochastic resonance process ineffective.

DESCRIPTION

It is an object of this invention to provide method and device for improving the detection of a vibrotactile stimulus. Such method includes the steps of temporarily altering the threshold of vibrational detection prior to the onset of a vibrotactile stimulus. This allows the vibrotactile system to achieve improved detection of the intended vibrotactile alert or communication stimulus without necessarily increasing the vibratory displacement amplitude of the stimulus. It is a further object of the present invention to provide an enhanced vibrotactile transducer device that is able to produce, over a wide frequency range, or at multiple frequencies, a vibrational stimulus against the body of a user.

The method for improving the detection of a vibrotactile stimulus includes the steps of adding a pre-emphasis vibrational signal in advance of the intended cueing or alert tactile signal. The pre-emphasis signal stimulus must have a vibrational amplitude and frequency content such that the user does not actively respond or mistake the pre-emphasis signal with the intended cueing or alert tactile signal. Therefore suitable pre-emphasis signals may sub-sensory (defined as below the threshold of sensitivity to touch, and will vary depending on the subject and location on the body) band-limited noise vibration, super-sensory (defined as above the threshold of sensitivity to touch, and will vary depending on the subject and location on the body) band-limited noise vibration or a low frequency (distinct from the frequency used for the intended cueing or alert tactile signal) super-sensory stimulus.

There are several mechanisms that explain why combing a low level pre-emphasis signal in advance of a vibrotactile stimulus result in an improved awareness and resultant perception of the intended vibrotactile signal. The addition of a pre-emphasis signal serves to "prime" the area of the skin (and the associated neuro-processing areas of the brain) where the tactor is placed. In the case of the pre-emphasis signal being band limited noise, the mechanism may be explained by stochastic resonance with a resultant reduction in the threshold of sensitivity such that when the same area of the body is activated with a supersensory stimulus, the users will perceive and therefore detect the vibrational amplitude more rapidly and/or to be higher amplitude that would be the case if the pre-emphasis signal were not applied. In other words, this approach lowers the sensitivity threshold curve. This effect is also illustrated in FIG. 1 for the case of stochastic resonance added to the sensory preceptors in an area of hairy skin. The overall threshold of vibration sensitivity 11 is seen to decrease compared to the threshold of sensitivity of hairy skin 10 without an added noise stimulus signal, in other words the area is more sensitive to vibration.

A second mechanism that explains the effects of a pre-emphasis signal on the detection of a subsequent vibrotactile stimulus may be due to the activation of neurons and specific areas in the somatosensory SI cortex (an area of the brain that is responsible for the detection of vibration and touch). It is possible that adaptation is accompanied by an increase in the spatial contrast in the response of contralateral primary somatosensory cortex (SI) to mechanical skin stimulation—an effect identified in previous imaging studies of SI cortex in anesthetized non-human primates [e.g., Simons, S. B., Tannan, V., Chiu, J., Favorov, O. V., Whitsel, B. L., Tommerdahl, M, 2005. Amplitude-dependency of response of SI cortex to flutter stimulation. BMC Neurosci. 6(1), 43 (June 21)]. An increase in spatial contrast may result in improved spatial localization and a decrease in the threshold of vibration sensitivity. This mechanism does not necessarily require sub-sensory signals—in fact improvements may be produced by low level, specific duration pre-emphasis signals as described hereinafter.

To present a suitable pre-emphasis signal, the vibrotactor actuator must provide both the pre-emphasis signal as well as the intended tactile signal (this is usually a super-sensory series of pulses modulating a 160 to 300 Hz sinusoidal vibration). The pre-emphasis and intended stimulus must usually be provided at the same locale on the body. Therefore there is a need to for an improved vibrotactile actuator that is contained in one housing, punctuate and can in the case pre-emphasis stimulus described by of band-limited noise, provide a low level low-frequency band-limited vibration (for the noise) and a high displacement vibrotactile stimulus of about 250 Hz. Similarly in the case of the pre-emphasis signal being a low frequency stimulus, there is a need for an improved vibrotactile actuator that can provide a low level, single frequency pre-emphasis stimulus followed by a high displacement vibrotactile stimulus of about 250 Hz.

Figure 2:
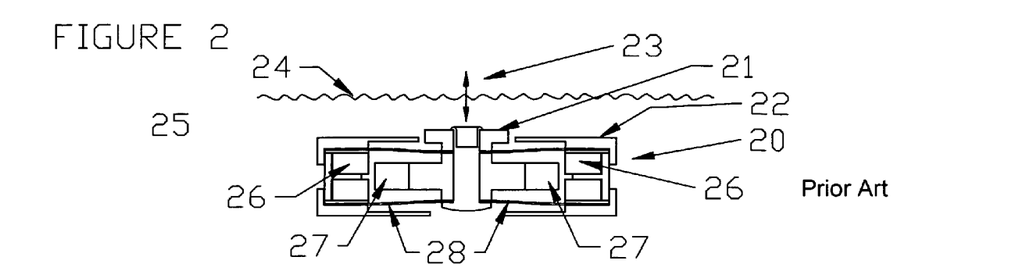
FIG. 2 illustrates an example of a vibrotactile transducer including a linear motor actuator.

The improved vibrotactile actuator device comprises a tactor utilizing a single actuator or multiple actuators combined together in some manner. Actuators could be linear motors (moving coil, moving magnet), piezoelectric, pneumatic, eccentric mass motors or other technologies that can provide a force and displacement to the skin. An example of a single prior art vibrotactile embodiment 25 as is shown in FIG. 2. FIG. 2 shows the body of the user 24 (the skin with or without intermediate layers of clothing), a vibrotactile actuator 25 comprising an electromagnetic linear motor (consisting of coils 26 and moving magnet 27), a mechanical spring system 28, a predominantly moving contactor 21 and housing 20. The system is a linear motor and therefore a current signal is introduced into the windings of the coils 26 to produce a magnetic field that interacts with the magnetic field of the permanent magnet 27, to produce relative motion (and forces) between the coils 26 and the magnet assembly 27 and 21. The front face of the tactor 22 and contactor 21 are in contact with the body 24 and the displacement of the contactor 22 produces a vibration 23 in the immediate skin area in contact with the contactor 21. Such exemplary devices may produce vibration displacements of up to 0.4 mm at a frequency of 250 Hz with rise times of less than 5 milliseconds. The low frequency characteristic displacement is however limited as a mechanical resonance (determined in part by the spring and masses of the components) occurs at a frequency between 200 and 300 Hz. For example low frequency response may be 16 dB (Re 1 micrometer) below the maximum device displacement at 250 Hz (for a constant current drive).

Figure 3:
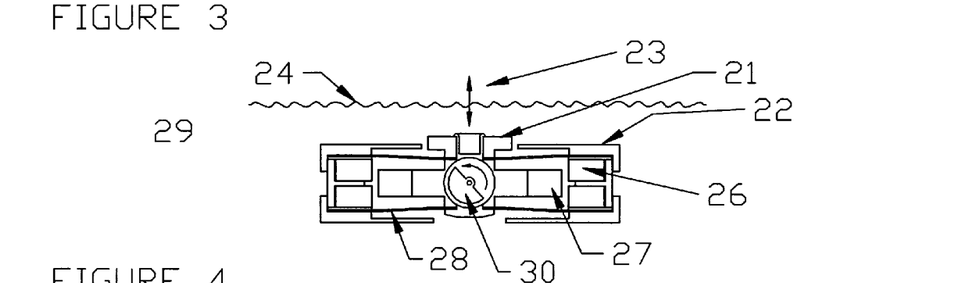
FIG. 3 illustrates an example of an improved vibrotactile transducer including two motor actuators, an eccentric mass motor (EMM) and a linear motor.

FIG. 3 shows an improved vibrotactile transducer 29 comprising two motor actuators—an eccentric mass motor (EMM) 30 and an electromagnetic linear motor (consisting of coils 26 and moving magnet 27). Each motor actuator is designed to produce a force that acts on the same common moving contactor 21 element. The eccentric mass motor 30 is mounted to the contactor 21 without effecting the operation of the electromagnetic linear motor magnet 27. The eccentric mass motor rotates imparting rotational inertia to the motor housing and the contactor 21. The contactor motion is constrained by the action of the spring system 28 to movement in predominantly the vertical direction 23. The resultant forces from the EMM 30 result in a predominantly low frequency vibratory displacement that is dependent on the masses in the system (including the eccentric mass on the EMM), the spring system 28, the body load 24 and the voltage drive to the EMM. Vibration from the EMM 30 may be added to the component of vibratory displacement 23 resulting from the excitation of the coils 26 of the electromagnetic linear motor using the principle of superposition. The phase of the various signals may be synchronized such as to add the vibratory responses constructively. Further, the operation frequency regions of the two motor actuators may be separated to produce an overall combined displacement response that has a multi-band frequency characteristic. This embodiment allows a low frequency vibratory displacement predominantly due to the EMM 30 and a higher frequency displacement due to the electromagnetic linear motor. The combination is therefore advantageously a dual band vibrotactor actuator.

Figure 4:
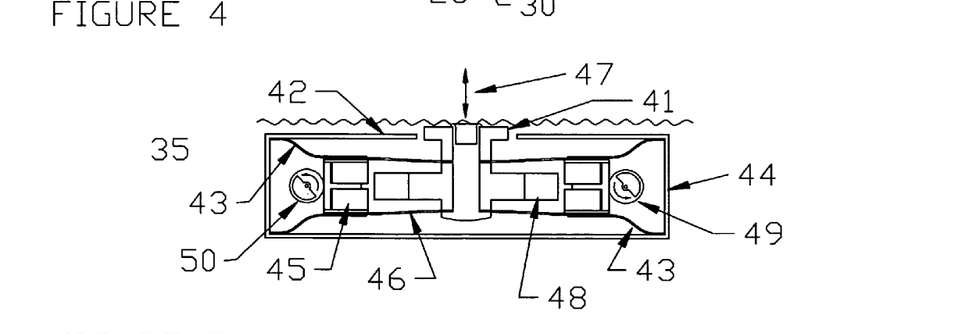
FIG. 4 illustrates an example of an improved vibrotactile transducer including at least two motor actuators and at least two spring systems.

FIG. 4 shows another embodiment of an improved vibrotactile transducer 35 comprising at least two motor actuators (49, 50 and an electromagnetic linear motor consisting of coils 45 and moving magnet 48) and at least two spring systems (46 and 43). At least one eccentric mass motor (EMM) 49 and 50 may be combined with an electromagnetic linear motor (consisting of coils 45 and moving magnet 48). The eccentric mass motors rotate imparting rotational inertia to the motor housing and the electromagnetic linear motor assembly (45 and 48). The electromagnetic linear motor assembly (45 and 48) is constrained within a device housing 44 by springs 43. The assembly motion is constrained by the action of the spring system 43 to movement in predominantly the vertical direction. The resultant forces from eccentric mass motors 49 and 50 result in a predominantly low frequency vibratory displacement that is dependent on the masses in the system (including the eccentric mass on the EMM), spring systems 43 and 46, the body load 24 on the contactor 41 and housing face 42, and the relative phase and orientation of the eccentric masses (for multiple EMM systems) and the voltage drive to the eccentric motors. This component of the displacement is also coupled over a wide frequency band, through the spring system 46 to the moving contactor 41 that acts through an opening in the housing front face 42 against the body of a user. The overall vibration 47 of the moving contactor 41 is due to the masses, springs and the combination of motor actuators in the system. Vibration from the eccentric mass motors may be added to the vibratory displacement resulting from the excitation of the coils 45 of the electromagnetic linear motor by solving the overall equations of motion for the complete transducer system 35. This embodiment provides low level wide bandwidth displacement together with a high displacement amplitude over a relatively wide operational bandwidth centered at a higher frequency range of operation.

Alternatively, since both the front face of the tactor 42, and the moving contactor 41 are in simultaneous contact with the body of the user, the masses in the system (including the eccentric mass on the EMM 49 and 50, the relative phase and orientation of the eccentric masses (for multiple EMM systems) and the voltage drive to the eccentric motors and the electromagnetic linear motor may be selected such that the pre-emphasis signal is provided by the housing 44 to an area of the body immediately surrounding the area to which the intended vibrational cueing or alert tactile signal is provided by the contactor 41

Figure 5A:
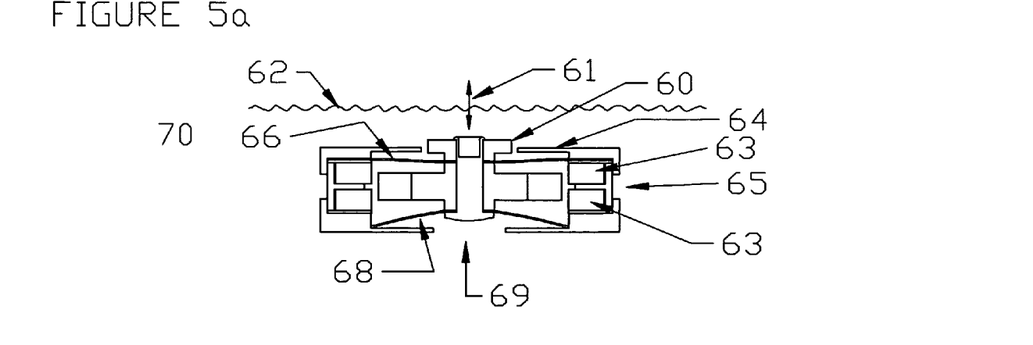
FIG. 5a illustrates an example of an improved vibrotactile transducer including at least two motor actuators, one motor being a composite piezoelectric bender.
Figure 5B:
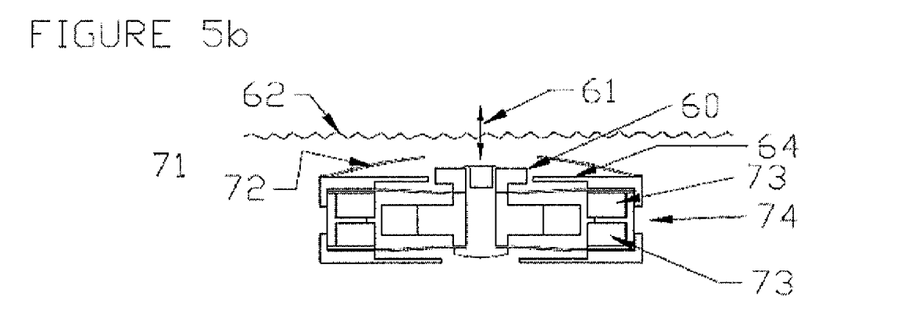
FIG. 5b illustrates another example of an improved vibrotactile transducer including at least two motor actuators, one motor being a composite piezoelectric bender.

FIG. 5a and FIG. 5b show another embodiment of an improved vibrotactile transducer 70 and 71, comprising at least two motor actuators, one motor actuator being a composite piezoelectric bender 68 and 72. In FIG. 5a. electromagnetic linear motor is held using a spring assembly 66 and at least one piezoelectric bender 68. The bender consists of film composite materials such as that provided by Smart Materials Inc., laminated using adhesive to a lightweight backing. A suitable bender active material is the Macro Fiber Composite (MFC). The MFC consists of rectangular piezo ceramic rods sandwiched between layers of adhesive and electroded polyimide film. This film contains electrodes that transfer the applied voltage directly to and from the ribbon shaped rods. This assembly enables in-plane poling, actuation, and sensing in a scaled, durable, ready-to-use package. A suitable substrate is a 0.2 to 2 mm thickness composite plate (such as G-10). The MFC is adhered to the in-active substrate using adhesives such as Loctite Hysol E-120HP.

The bender 68 has a very high compliance and is mechanically resonant at a low frequency. The bender 68 is driven using a high voltage drive signal and results in the displacement of the moving contactor 60. The moving contactor 60 protrudes from a gap in the housing face 64 and acts on the adjacent body load. Vibration from the bender 68 may be added to the vibratory displacement resulting from the excitation of the coils 63 of the electromagnetic linear motor using the principle of superposition. The phase of the various signals may be synchronized such as to add the vibratory 61 displacement responses constructively. This embodiments allows a low frequency vibratory displacement predominantly due to the bender and a higher frequency displacement predominantly due to the electromagnetic linear motor. The combination is therefore advantageously a dual band or wide bandwidth vibrotactor actuator. FIG. 5b. shows another embodiment of this concept 71 that combines two actuators consisting of at least one bender 72 and an electromagnetic linear actuator 60. Both actuators act on the adjacent area of a users body 62. Typically the bender actuator will operate at a low frequency to apply the pre-emphasis signal while the electromagnetic actuator may operate at a large displacement 61 at a higher frequency to provide the intended cueing or alert tactile. The combination is therefore advantageously a dual band vibrotactor actuator.

Figure 6A:
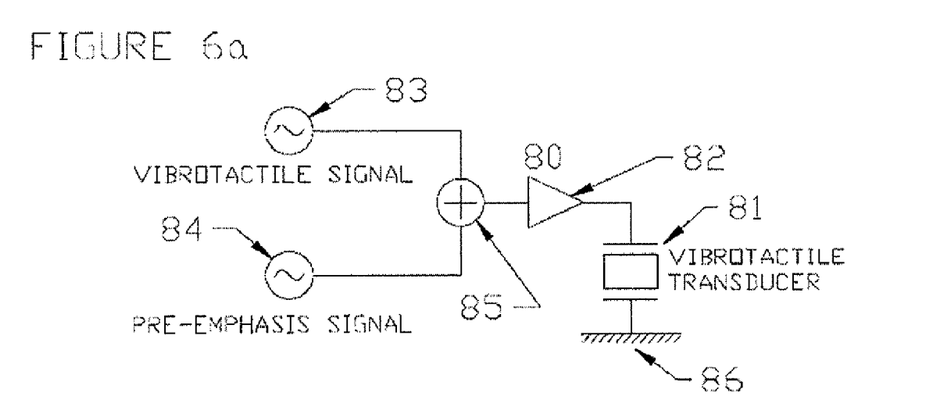
FIG. 6a illustrates an example of a system that drives a single vibrotactile actuator with desired pre-emphasis and vibrotactile stimulus signals.

FIG. 6a shows an example of a system 80 that will preferentially drive vibrotactile devices such as that depicted in FIG. 2 with the desired pre-emphasis and desired vibrotactile stimulus signals. The system 80 must provide the vibrotactor actuator with a current and voltage waveform signal that includes both the pre-emphasis signal as well as the intended cueing or alert tactile signal. Such a system would comprise the pre-emphasis signal 84 and stimulus signals 83 which are summed 85, amplified using a conventional signal amplifier 82 and provided to the transducer 81 (usually the coil is driven with a current waveform). A return 86 is provided. Care should be taken to set the amplitude levels, timing and duration of the various signal waveforms as described hereinafter.

Figure 6B:
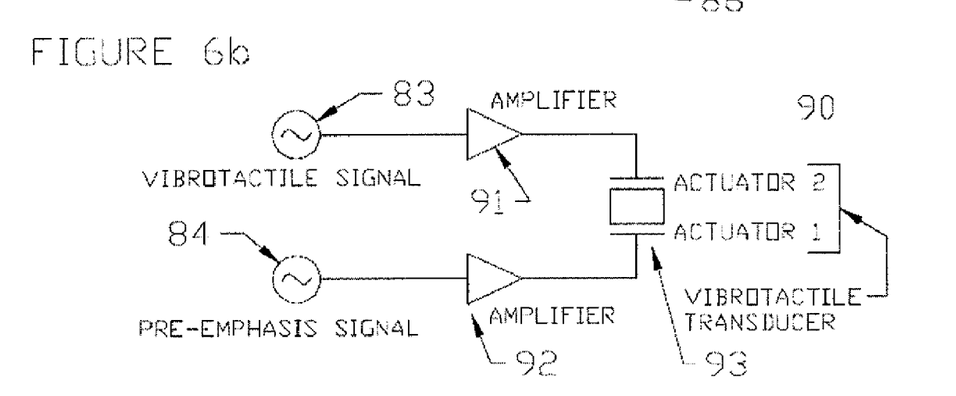
FIG. 6b illustrates an example of a system that drives multiple vibrotactile actuators with desired pre-emphasis and vibrotactile stimulus signals.

FIG. 6b describes an alternate control embodiment 90, that is suitable for driving multiple actuator motors such as those described in FIGS. 3 to 5. The system 90 must provide each respective component vibrotactor actuator with a current and voltage waveform signal that is representative of either the pre-emphasis signal 84 or the intended tactile signal 83. Such a system would comprise the pre-emptive signal 84 which is amplifier 92 and provided to the actuator motor that will impart the pre-emptive signal. The system would also comprise a stimulus signal 83 which is amplified using a conventional signal amplifier 91 and provided to the actuator motor that will impart the intended stimulus signal. Care should be taken to set the amplitude levels, timing and duration of the various signal waveforms as described hereinafter.

A single tactor with one or more actuators that are co-located geometrically as shown in FIG. 2, FIG. 3, FIG. 4 and FIG. 5 are the preferred embodiments. However, in certain applications two separate tactors can also be located within the same region of the body to produce similar effects. In this case the tactors can be two electromagnetic vibrotactile transducers (such as that shown in FIG. 2), or combinations of an electromagnetic vibrotactile transducer and other actuators (such as an eccentric mass motor). Further, in the separate actuator embodiment, actuators should be spaced within about 3 inches of one another.

The controller circuit FIG. 6a would apply at least 2 different signals to a single actuator, or FIG. 6b at least one signal to each of two or more actuator motors that may be combined in a single improved vibrotactile actuator. One signal would be a pre-emphasis signal comprising either band limited noise or a tone that would cause the actuator to output a low level super-sensory or sub-sensory vibration against the skin with that same signal characteristic. This pre-emphasis signal would be provided for at least some period of time prior to the generation of the second signal. The second signal would typically be a tone or series of tone pulses that would cause the actuator to output a high level (super sensory) vibration against the skin with that same signal characteristic. The second signal provides the user with an intended tactile stimulus that can be used to provide navigational, orientation or communication information via the sense of touch.

Figure 7:
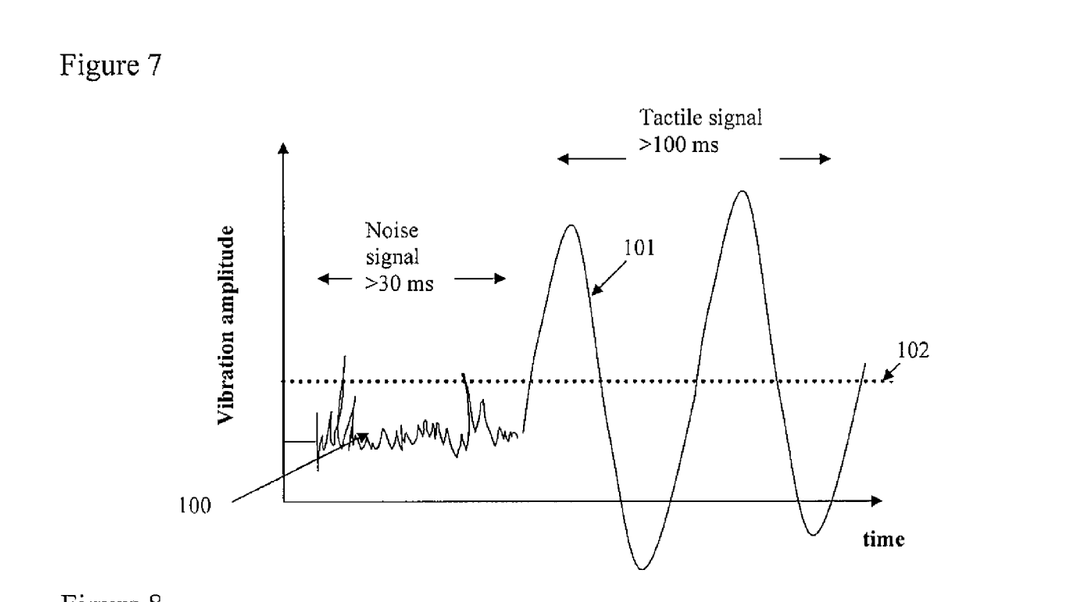
FIG. 7 illustrates a graph of a pre-emphasis signal and a stimulus signal, where the pre-emphasis signal is sub-sensory noise.
Figure 8:
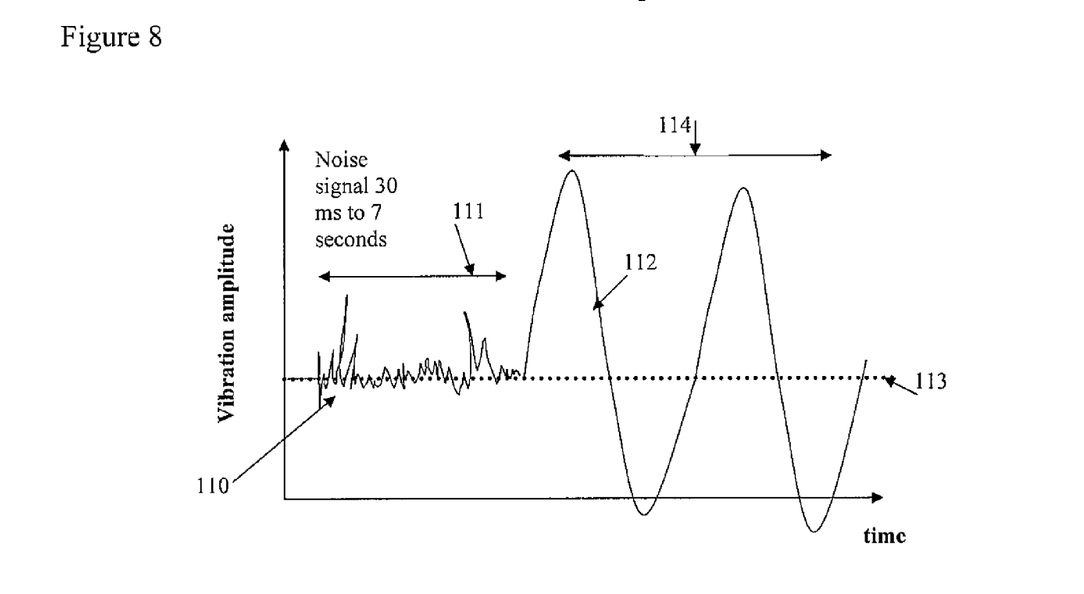
FIG. 8 illustrates a graph of a pre-emphasis signal and a stimulus signal, where the pre-emphasis signal is low level noise.
Figure 9:
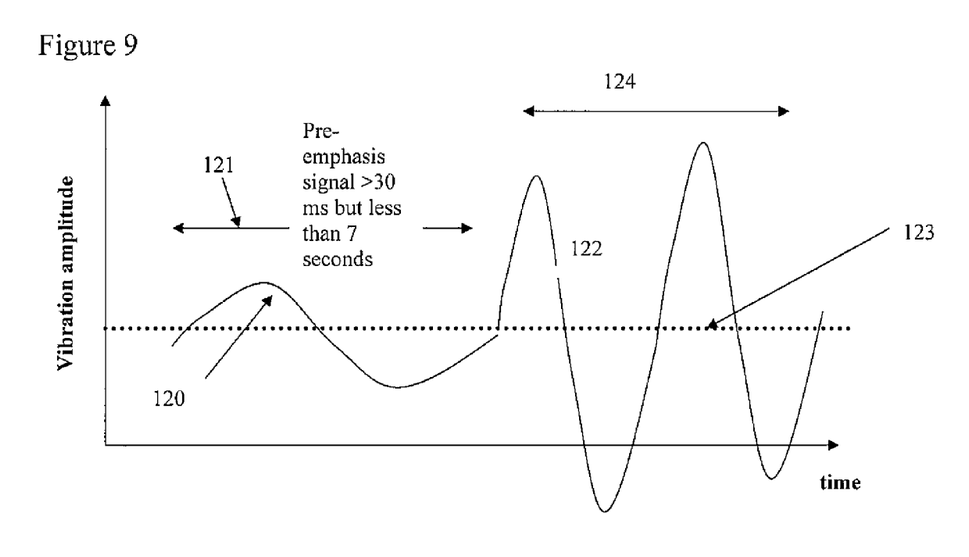
FIG. 9 illustrates a graph of a pre-emphasis signal and a stimulus signal, where the pre-emphasis signal is low level, low frequency sinusoidal signal.

Various examples of suitable signals and the temporal relationship between the signals is shown in FIG. 7, FIG. 8 and FIG. 9.

FIG. 7 shows the case of the pre-emphasis signal being sub-sensory noise 100. The pre-emphasis signal 100 must precede the stimulus 101 and be present for at least 30 milliseconds. The band-limited noise signal 100 is sub-sensory 102, therefore this signal may be continuous as there will be no adaptation. The stimulus signal 101 displacement is typically 10 to 30 dB (Re 1 micrometer) larger in displacement amplitude than the pre-emphasis signal. The stimulus signal is usually greater than 100 milliseconds in duration and is often a pulse train consisting of bursts of several hundred milliseconds with a corresponding off period between bursts.

The band limited noise 100 should be within the range 0 to 1 kHz and more preferably 0 to 100 Hz. It is also desirable to limit the band limited noise to about 90% of the level for the threshold of detection 102. As described previously, this level depends on location and frequency, therefore it is common to set this level via a calibration procedure as outlined in the prior art. In practical use, the threshold for sensitivity may change with activity, loading and the environment. Therefore if the pre-emphasis signal is chosen to be continuous sub-sensory noise, the pre-emphasis signal displacement amplitude must be varied. A suitable system for achieving this would be to combine additional sensor components to measure the users motion, the loading and coupling between the body and the vibrotactile actuator as well as physiological spects (for example the users heart rate and temperature). The sensor items could be fed into an intelligent controller that would control the amplification and displacement amplitude of the pre-emphasis signal such that the resultant level remained sub-sensory threshold. Typical noise signal displacement levels for hairy skin in healthy individuals will be about 20 to 200 μm.

The stimulus signal 101 will typically be in the range 20 to 400 Hz and more preferably in the range 160 to 280 Hz. Typical stimulus signal 101 displacement levels will be above the threshold of sensitivity for that body location (and frequency) and about 100 to 800 μm.

FIG. 8 shows the embodiment of the pre-emphasis signal being low level noise 110. The noise may have a band-limited characteristic as has been previously described. The pre-emphasis signal 110 must precede the stimulus 112 and be present for at least 30 milliseconds. Preferably the pre-emphasis signal 110 should also be limited in duration 111 to less than 7 seconds to prevent sensory adaptation. The pre-emphasis signal should also be limited in amplitude to about 1 to 16 dB (Re 1 micrometer) above the sensory vibration threshold 113. Care should be take in setting the level of the pre-emphasis signal as the vibration threshold 113 depends on locale, frequency and the environment (as described hereinbefore) and should not normally cause a response in the user or be detected by the user. An adaptive level setting system using additional sensor systems and an intelligent controller as described previously, can be used to dynamically set the pre-emphasis signal amplitude based on user activity. The stimulus signal 112 is typically 10 to 30 dB (Re 1 micrometer) larger in displacement amplitude than the pre-emphasis signal 110. The stimulus signal 112 is usually greater than 100 milliseconds in duration 114 and is often a pulse train consisting of bursts of several hundred milliseconds with a corresponding off period between bursts.

FIG. 9 shows the embodiment of the pre-emphasis signal being a low level, low frequency sinusoidal signal 120. The pre-emphasis signal 120 must precede the stimulus 122 and be present for at least 30 ms. Preferably the pre-emphasis signal 120 should also be limited in duration 121 to less than 7 seconds to prevent adaptation. The pre-emphasis signal should also be between 1 and 100 Hz, most preferably between 5 and 30 Hz. The pre-emphasis signal should also be limited in amplitude to about 1 to 16 dB (Re 1 micrometer) above the sensory vibration threshold 123. Care should be take in setting the level of the pre-emphasis signal as the vibration threshold 123 depends on locale, frequency and the environment (as described hereinbefore) and should not normally cause a response in the user or be detected by the user. An adaptive level setting system using additional sensor systems and an intelligent controller as described previously, can be used to dynamically set the pre-emphasis signal amplitude and frequency based on user activity. The stimulus signal 122 is typically 10 to 30 dB (Re 1 micrometer) larger in displacement amplitude than the pre-emphasis signal 120. The stimulus signal 122 is usually greater than 100 milliseconds in duration 124 and is often a pulse train consisting of bursts of several hundred milliseconds with a corresponding off period between bursts The innovative method presented in this patent is the combination of a low level super-sensory or sub-sensory pre emphasis signal and super-sensory vibrational signal to enhance perception of a vibrotactile stimulus provided to improve the presentation of navigational, orientation or communication information via the sense of touch. The method involves providing the sub-sensory vibration on a continuous basis, or a low level super-sensory or sub-sensory vibration for some period prior to the presentation of the super-sensory vibration that conveys the intended tactile information.

What is claimed is:

1. An enhanced vibrotactor stimulator device to achieve improved detection of an intended vibrotactile alert without increasing the vibratory displacement amplitude of the stimulus against a body of a user, comprising:
    means for pre-empting a vibrotactile stimulus with a low level stimulus below the vibratory displacement amplitude of the intended vibrotactile alert and will vary depending on a location on the body for a predetermined period of time; and
    means for applying a desired vibrotactile stimulus after operation of the means for pre-empting the vibrotactile stimulus wherein the desired vibrotactile stimulus provides navigational, orientation or communication information to the user via the sense of touch.

2. The enhanced vibrotactor stimulator device of claim 1 wherein said means for pre-empting said vibrotactile stimulus and said means for applying said desired vibrotactile stimulus comprise an actuator to provide a vibratory stimulus and a pre-emphasis stimulus at a common site on the body.

3. The enhanced vibrotactor stimulator device of claim 1 wherein said means for pre-empting said vibrotactile stimulus and said means for applying said desired vibrotactile stimulus comprise a linear actuator driven by a signal comprising a sum of a sine wave in a frequency range of 1 to 300 Hz and a band limited noise signal in the range of 1 to 1000 Hz.

4. The enhanced vibrotactor stimulator device of claim 3 wherein an amplitude of said sine wave is 10 to 30 dB above an average amplitude of said band limited noise signal.

5. The enhanced vibrotactor stimulator device of claim 3 wherein a amplitude of said band limited noise signal in is a range from sub-sensory to 16 dB above a sensory vibration threshold at the body site where the device is located.

6. The enhanced vibrotactor stimulator device of claim 3 wherein said band limited noise signal precedes said sine wave by between 0.1 and 7 seconds.

7. The enhanced vibrotactor stimulator device of claim 1 wherein said means for pre-empting said vibrotactile stimulus and said means for applying said desired vibrotactile stimulus comprise a linear actuator driven by a signal comprising a sine wave in a frequency range of 1 to 300 Hz and a pre-emphasis stimulus provided by a co-located eccentric mass motor driven by a sine wave in the range of 1 to 100 Hz.

8. The enhanced vibrotactor stimulator device of claim 7 wherein said eccentric mass motor is directly coupled to a moving contactor of said linear actuator so that said pre-emphasis stimulus and said vibrotactile stimulus is provided by said moving contactor which is in contact with the body of the user.

9. The enhanced vibrotactor stimulator device of claim 7 wherein said eccentric mass motor is coupled to a housing of said linear actuator so that said pre-emphasis stimulus is provided by a front face of said housing which is in contact with body of the user.

10. The enhanced vibrotactor stimulator device of claim 7 wherein a voltage and current drive signals to said eccentric mass motor and said linear actuator are provided by independent amplifiers.

11. The enhanced vibrotactor stimulator device of claim 7 wherein the drive signal to said eccentric mass motor precedes the drive signal to said linear actuator by between 0.1 and 7 seconds.

12. The enhanced vibrotactor stimulator device of claim 7 wherein an amplitude of said pre-emphasis stimulus in is a range from sub-sensory to 16 dB above a sensory vibration threshold at the body site where the device is located.

13. The enhanced vibrotactor stimulator device of claim 1 wherein said means for pre-empting said vibrotactile stimulus and said means for applying said desired vibrotactile stimulus comprise a linear actuator and a composite piezoelectric bender coupled to a moving contactor which is in contact with the body of the user.

14. The enhanced vibrotactor stimulator device of claim 1 wherein said means for pre-empting said vibrotactile stimulus and said means for applying said desired vibrotactile stimulus comprise a linear actuator and a composite piezoelectric bender on a front face of a housing which is in contact with the body of the user.

* * * * *